United States Patent
Bergdale et al.

(10) Patent No.: US 10,346,764 B2
(45) Date of Patent: Jul. 9, 2019

(54) METHOD AND SYSTEM FOR DISTRIBUTING ELECTRONIC TICKETS WITH VISUAL DISPLAY FOR VERIFICATION

(71) Applicant: Bytemark, Inc., New York, NY (US)

(72) Inventors: Micah Bergdale, New York, NY (US); Matthew Grasser, New York, NY (US); Nicholas Ihm, New York, NY (US); Samuel Krueckeberg, New York, NY (US); Gregory Valyer, Park Ridge, IL (US)

(73) Assignee: BYTEMARK, INC., New York, NY (US)

( * ) Notice: Subject to any disclaimer, the term of this patent is extended or adjusted under 35 U.S.C. 154(b) by 518 days.

(21) Appl. No.: 14/823,157

(22) Filed: Aug. 11, 2015

(65) Prior Publication Data

US 2015/0347931 A1    Dec. 3, 2015

Related U.S. Application Data

(63) Continuation of application No. 13/901,243, filed on May 23, 2013, now Pat. No. 9,239,993, and a
(Continued)

(51) Int. Cl.
*G06Q 10/02* (2012.01)
*G06Q 30/02* (2012.01)
(Continued)

(52) U.S. Cl.
CPC ......... *G06Q 10/02* (2013.01); *G06Q 20/0457* (2013.01); *G06Q 20/10* (2013.01); *G06Q 20/3274* (2013.01); *G06Q 30/0255* (2013.01)

(58) Field of Classification Search
None
See application file for complete search history.

(56) References Cited

U.S. PATENT DOCUMENTS

| | | | |
|---|---|---|---|
| 4,193,114 A | 3/1980 | Benini | |
| 5,253,166 A | 10/1993 | Dettelbach | |

(Continued)

FOREIGN PATENT DOCUMENTS

| | | |
|---|---|---|
| EP | 1439495 A1 | 7/2004 |
| GB | 2390211 | 12/2003 |

(Continued)

OTHER PUBLICATIONS

S. K. Chang, G. Polese, R. Thomas and S. Das, "A visual language for authorization modeling," Proceedings. 1997 IEEE Symposium on Visual Languages (Cat. No. 97TB100180), Isle of Capri, Italy, 1997, pp. 110-118. doi: 10.1109/VL.1997.626565 (Visual Language).*

(Continued)

*Primary Examiner* — Chikaodinaka Ojiaku
(74) *Attorney, Agent, or Firm* — Jennifer Meredith; Meredith Attorneys, PLLC

(57) ABSTRACT

This invention discloses a novel system and method for distributing electronic ticketing such that the ticket is verified at the entrance to venues by means of an animation or other human perceptible verifying visual object that is selected by the venue for the specific event. This removes the need to use a bar-code scanner on an LCD display of a cell phone or other device and speeds up the rate at which human ticket takers can verify ticket holders. The system also can permit ticket purchase verification in the absence of a network connection during verification.

28 Claims, 16 Drawing Sheets

Related U.S. Application Data continuation of application No. 13/475,881, filed on May 18, 2012, now Pat. No. 8,494,967, which is a continuation-in-part of application No. 13/110,709, filed on May 18, 2011, now abandoned, which is a continuation-in-part of application No. 13/046,413, filed on Mar. 11, 2011, now Pat. No. 10,089,606.

(51) Int. Cl.
   *G06Q 20/10* (2012.01)
   *G06Q 20/04* (2012.01)
   *G06Q 20/32* (2012.01)

(56) References Cited

U.S. PATENT DOCUMENTS

| | | | |
|---|---|---|---|
| 5,465,084 A | 11/1995 | Cottrell | |
| 5,559,961 A | 9/1996 | Blonder | |
| 5,590,038 A | 12/1996 | Pitroda | |
| 5,621,797 A | 4/1997 | Rosen | |
| 5,686,987 A * | 11/1997 | Hewitt | G01N 21/8803 356/237.1 |
| 5,777,305 A | 7/1998 | Smith | |
| 5,789,732 A | 8/1998 | McMahon | |
| 5,797,330 A | 8/1998 | Li | |
| 5,907,830 A | 5/1999 | Engel | |
| 5,918,909 A | 7/1999 | Fiala | |
| 6,023,679 A * | 2/2000 | Acebo | G06Q 10/02 705/5 |
| 6,023,688 A | 2/2000 | Ramachandran | |
| 6,085,976 A | 7/2000 | Sehr | |
| 6,175,922 B1 * | 1/2001 | Wang | G06Q 20/02 380/255 |
| 6,251,017 B1 | 6/2001 | Leason | |
| 6,315,195 B1 | 11/2001 | Ramachandran | |
| 6,373,587 B1 | 4/2002 | Sansone | |
| 6,393,305 B1 | 5/2002 | Ulvinen | |
| 6,454,174 B1 | 9/2002 | Sansone | |
| 6,473,739 B1 | 10/2002 | Showghi | |
| 6,484,182 B1 | 11/2002 | Dunphy | |
| 6,493,110 B1 | 12/2002 | Roberts | |
| 6,496,809 B1 | 12/2002 | Nakfoor | |
| 6,685,093 B2 | 2/2004 | Challa | |
| 6,775,539 B2 * | 8/2004 | Deshpande | G06Q 30/02 455/414.4 |
| 6,961,858 B2 | 11/2005 | Fransdonk | |
| 6,997,384 B2 | 2/2006 | Hara | |
| 7,017,806 B2 * | 3/2006 | Peterson | G06Q 10/02 235/384 |
| 7,020,635 B2 | 3/2006 | Hamilton | |
| 7,024,807 B2 | 4/2006 | Street | |
| 7,044,362 B2 | 5/2006 | Yu | |
| 7,080,049 B2 | 7/2006 | Truitt | |
| 7,090,128 B2 | 8/2006 | Farley | |
| 7,093,130 B1 | 8/2006 | Kobayashi | |
| 7,103,572 B1 | 9/2006 | Kawaguchi | |
| 7,107,462 B2 | 9/2006 | Fransdonk | |
| 7,134,087 B2 * | 11/2006 | Bushold | G06Q 20/20 715/764 |
| 7,150,045 B2 | 12/2006 | Koelle | |
| 7,158,939 B2 * | 1/2007 | Goldstein | G06Q 10/02 705/5 |
| 7,174,462 B2 | 2/2007 | Pering | |
| 7,191,221 B2 * | 3/2007 | Schatz | H04L 51/30 709/206 |
| 7,263,506 B2 | 8/2007 | Lee | |
| 7,289,959 B2 * | 10/2007 | Praca | G06K 9/00154 382/115 |
| 7,315,944 B2 | 1/2008 | Dutta | |
| 7,386,517 B1 * | 6/2008 | Donner | G06Q 10/02 705/14.14 |
| 7,392,226 B1 | 6/2008 | Sasaki | |
| 7,395,506 B2 | 7/2008 | Tan | |
| 7,493,261 B2 * | 2/2009 | Chen | G06Q 10/02 705/5 |
| 7,520,427 B2 | 4/2009 | Boyd | |
| 7,529,934 B2 | 5/2009 | Fujisawa | |
| 7,555,284 B2 | 6/2009 | Yan | |
| 7,567,910 B2 | 7/2009 | Hasegawa | |
| 7,587,502 B2 | 9/2009 | Crawford | |
| 7,617,975 B2 | 11/2009 | Wada | |
| 7,711,586 B2 | 5/2010 | Aggarwal | |
| 7,933,589 B1 | 4/2011 | Mamdani | |
| 7,967,211 B2 | 6/2011 | Challa | |
| 8,010,128 B2 | 8/2011 | Silverbrook | |
| 8,016,187 B2 | 9/2011 | Frantz | |
| 8,019,365 B2 | 9/2011 | Fisher | |
| 8,370,180 B2 | 2/2013 | Scott | |
| 8,379,874 B1 | 2/2013 | Simon | |
| 8,457,354 B1 | 6/2013 | Kolar | |
| 8,473,342 B1 | 6/2013 | Roberts | |
| 8,583,511 B2 | 11/2013 | Hendrickson | |
| 8,584,224 B1 * | 11/2013 | Pei | H04L 9/3213 713/168 |
| 8,788,836 B1 | 7/2014 | Hernacki | |
| 8,912,879 B2 | 12/2014 | Fyke | |
| 8,935,802 B1 * | 1/2015 | Mattsson | G06F 21/6245 726/26 |
| 9,152,900 B1 * | 10/2015 | Santiago | G06K 15/4095 |
| 9,292,731 B2 * | 3/2016 | Carrizo | G06K 9/00167 |
| 9,478,086 B1 * | 10/2016 | Berge | H04L 63/0815 |
| 9,911,123 B2 * | 3/2018 | Van Os | G06Q 20/40 |
| 10,055,634 B2 * | 8/2018 | Han | G06K 9/00033 |
| 10,102,403 B1 * | 10/2018 | Akens | G06F 21/31 |
| 2001/0005840 A1 | 6/2001 | Verkama | |
| 2001/0014870 A1 * | 8/2001 | Saito | G06Q 20/204 705/14.26 |
| 2001/0016825 A1 | 8/2001 | Pugliese | |
| 2001/0037174 A1 | 11/2001 | Dickerson | |
| 2001/0044324 A1 | 11/2001 | Carayiannis | |
| 2001/0051787 A1 | 12/2001 | Haller | |
| 2001/0052545 A1 | 12/2001 | Serebrennikov | |
| 2001/0054111 A1 | 12/2001 | Lee | |
| 2002/0010603 A1 | 1/2002 | Doi | |
| 2002/0016929 A1 * | 2/2002 | Harashima | G06F 21/6218 726/28 |
| 2002/0023027 A1 | 2/2002 | Simonds | |
| 2002/0040308 A1 | 4/2002 | Hasegawa | |
| 2002/0040346 A1 | 4/2002 | Kwan | |
| 2002/0060246 A1 | 5/2002 | Gobburu | |
| 2002/0065713 A1 | 5/2002 | Awada | |
| 2002/0065783 A1 | 5/2002 | Na | |
| 2002/0081590 A1 * | 6/2002 | Penn | C07K 14/47 435/6.16 |
| 2002/0090930 A1 | 7/2002 | Fujiwara | |
| 2002/0094090 A1 | 7/2002 | Iino | |
| 2002/0126780 A1 | 9/2002 | Oshima | |
| 2002/0138346 A1 | 9/2002 | Kodaka | |
| 2002/0145505 A1 | 10/2002 | Sata | |
| 2002/0184539 A1 | 12/2002 | Fukuda | |
| 2002/0196274 A1 | 12/2002 | Comfort | |
| 2003/0036929 A1 * | 2/2003 | Vaughan | G06Q 10/02 705/5 |
| 2003/0066883 A1 | 4/2003 | Yu | |
| 2003/0069763 A1 | 4/2003 | Gathman | |
| 2003/0069827 A1 | 4/2003 | Gathman | |
| 2003/0093695 A1 | 5/2003 | Dutta | |
| 2003/0105641 A1 | 6/2003 | Lewis | |
| 2003/0105954 A1 * | 6/2003 | Immonen | G06Q 20/04 713/156 |
| 2003/0105969 A1 | 6/2003 | Matsui | |
| 2003/0154169 A1 | 8/2003 | Yanai | |
| 2003/0163787 A1 | 8/2003 | Hay | |
| 2003/0172037 A1 | 9/2003 | Jung | |
| 2003/0194704 A1 * | 10/2003 | Penn | C12Q 1/6876 435/6.11 |
| 2003/0200184 A1 | 10/2003 | Dominguez | |
| 2003/0229790 A1 * | 12/2003 | Russell | G06Q 10/02 713/172 |
| 2003/0233276 A1 * | 12/2003 | Pearlman | G06Q 20/3274 705/14.23 |

(56) References Cited

U.S. PATENT DOCUMENTS

| | | | |
|---|---|---|---|
| 2004/0019564 A1* | 1/2004 | Goldthwaite | G06Q 20/04 705/44 |
| 2004/0019792 A1 | 1/2004 | Funamoto | |
| 2004/0030081 A1 | 2/2004 | Hegi | |
| 2004/0030091 A1 | 2/2004 | McCullough | |
| 2004/0030658 A1 | 2/2004 | Cruz | |
| 2004/0039635 A1 | 2/2004 | Linde | |
| 2004/0073446 A1* | 4/2004 | Snow | G06Q 10/101 705/300 |
| 2004/0085351 A1 | 5/2004 | Tokkonen | |
| 2004/0101158 A1 | 5/2004 | Butler | |
| 2004/0111373 A1* | 6/2004 | Iga | G06F 21/10 705/51 |
| 2004/0125124 A1* | 7/2004 | Kim | G11B 27/034 715/716 |
| 2004/0128509 A1 | 7/2004 | Gehrmann | |
| 2004/0133927 A1* | 7/2004 | Sternberg | G06K 9/00624 725/136 |
| 2004/0148253 A1 | 7/2004 | Shin | |
| 2004/0169589 A1* | 9/2004 | Lea | G01S 13/75 340/8.1 |
| 2004/0186884 A1* | 9/2004 | Dutordoir | H04L 51/30 709/206 |
| 2004/0210476 A1* | 10/2004 | Blair | G06Q 10/02 705/13 |
| 2004/0224703 A1* | 11/2004 | Takaki | H04W 4/02 455/457 |
| 2004/0250138 A1 | 12/2004 | Schneider | |
| 2005/0059339 A1* | 3/2005 | Honda | G06K 1/12 455/3.01 |
| 2005/0060554 A1 | 3/2005 | ODonoghue | |
| 2005/0070257 A1 | 3/2005 | Saarinen | |
| 2005/0108912 A1 | 5/2005 | Bekker | |
| 2005/0109838 A1 | 5/2005 | Linlor | |
| 2005/0111723 A1 | 5/2005 | Hannigan | |
| 2005/0116030 A1 | 6/2005 | Wada | |
| 2005/0137889 A1 | 6/2005 | Wheeler | |
| 2005/0204140 A1 | 9/2005 | Maruyama | |
| 2005/0212760 A1 | 9/2005 | Marvit | |
| 2005/0240589 A1 | 10/2005 | Altenhofen | |
| 2005/0246634 A1 | 11/2005 | Ortwein | |
| 2005/0252964 A1 | 11/2005 | Takaki | |
| 2005/0253817 A1 | 11/2005 | Rytivaara | |
| 2005/0272473 A1* | 12/2005 | Sheena | H04M 3/4931 455/563 |
| 2005/0283444 A1 | 12/2005 | Ekberg | |
| 2006/0082788 A1* | 4/2006 | Muchnik | G01N 9/24 356/614 |
| 2006/0120607 A1 | 6/2006 | Lev | |
| 2006/0161446 A1 | 7/2006 | Fyfe | |
| 2006/0170933 A1* | 8/2006 | Muchnik | G01B 11/272 356/614 |
| 2006/0174339 A1 | 8/2006 | Tao | |
| 2006/0206724 A1* | 9/2006 | Schaufele | G06F 21/32 713/186 |
| 2006/0206728 A1 | 9/2006 | Masuda | |
| 2006/0293929 A1* | 12/2006 | Wu | G06Q 10/02 705/5 |
| 2007/0011265 A1* | 1/2007 | Liezenberg | G06Q 10/107 709/217 |
| 2007/0012765 A1* | 1/2007 | Trinquet | G06K 17/00 235/382 |
| 2007/0017979 A1 | 1/2007 | Wu | |
| 2007/0022058 A1 | 1/2007 | Labrou | |
| 2007/0032225 A1 | 2/2007 | Konicek | |
| 2007/0057979 A1* | 3/2007 | Gardner | B41J 2/0456 347/5 |
| 2007/0136213 A1 | 6/2007 | Sansone | |
| 2007/0150842 A1 | 6/2007 | Chaudhri | |
| 2007/0156443 A1* | 7/2007 | Gurvey | G06Q 10/02 705/64 |
| 2007/0192590 A1 | 8/2007 | Pomerantz | |
| 2007/0215687 A1 | 9/2007 | Waltman | |
| 2007/0260543 A1 | 11/2007 | Chappuis | |
| 2007/0265891 A1 | 11/2007 | Guo | |
| 2007/0271455 A1* | 11/2007 | Nakano | G06Q 20/1235 713/154 |
| 2007/0273514 A1 | 11/2007 | Winand | |
| 2007/0276944 A1 | 11/2007 | Samovar | |
| 2007/0283049 A1 | 12/2007 | Rakowski | |
| 2007/0288319 A1 | 12/2007 | Robinson | |
| 2008/0007388 A1 | 1/2008 | Au | |
| 2008/0071587 A1* | 3/2008 | Granucci | G06Q 10/02 705/5 |
| 2008/0071637 A1 | 3/2008 | Saarinen | |
| 2008/0120127 A1* | 5/2008 | Stoffelsma | G06Q 10/02 705/1.1 |
| 2008/0120186 A1 | 5/2008 | Jokinen | |
| 2008/0154623 A1 | 6/2008 | Derker | |
| 2008/0191009 A1 | 8/2008 | Gressel | |
| 2008/0191909 A1 | 8/2008 | Mak | |
| 2008/0201212 A1 | 8/2008 | Hammad | |
| 2008/0201576 A1 | 8/2008 | Kitagawa | |
| 2008/0201769 A1 | 8/2008 | Finn | |
| 2008/0227518 A1 | 9/2008 | Wiltshire | |
| 2008/0263077 A1 | 10/2008 | Boston | |
| 2008/0288302 A1* | 11/2008 | Daouk | G06Q 10/02 705/5 |
| 2008/0308638 A1* | 12/2008 | Hussey | G06K 7/10 235/462.11 |
| 2009/0055288 A1 | 2/2009 | Nassimi | |
| 2009/0088077 A1 | 4/2009 | Brown | |
| 2009/0097714 A1* | 4/2009 | Naccache | G06F 21/32 382/117 |
| 2009/0125387 A1 | 5/2009 | Mak | |
| 2009/0196470 A1* | 8/2009 | Carl | A61N 5/1049 382/128 |
| 2009/0210814 A1* | 8/2009 | Agrusa | G05B 23/0267 715/772 |
| 2009/0222900 A1* | 9/2009 | Benaloh | H04L 9/3213 726/9 |
| 2009/0284482 A1 | 11/2009 | Chin | |
| 2010/0017872 A1 | 1/2010 | Goertz | |
| 2010/0044444 A1 | 2/2010 | Jain | |
| 2010/0082491 A1 | 4/2010 | Rosenblatt | |
| 2010/0121766 A1 | 5/2010 | Sugaya | |
| 2010/0201536 A1 | 8/2010 | Robertson | |
| 2010/0211452 A1 | 8/2010 | DAngelo | |
| 2010/0219234 A1 | 9/2010 | Forbes | |
| 2010/0228563 A1 | 9/2010 | Walker, Jr. | |
| 2010/0228576 A1 | 9/2010 | Marti | |
| 2010/0253470 A1 | 10/2010 | Burke | |
| 2010/0253471 A1* | 10/2010 | Abe | G06F 21/32 340/5.83 |
| 2010/0268649 A1* | 10/2010 | Roos | G06F 21/10 705/50 |
| 2010/0274691 A1 | 10/2010 | Hammad | |
| 2010/0279610 A1* | 11/2010 | Bjorhn | G06Q 20/20 455/41.2 |
| 2010/0306718 A1 | 12/2010 | Shim | |
| 2010/0308959 A1 | 12/2010 | Schorn | |
| 2010/0322485 A1 | 12/2010 | Riddiford | |
| 2011/0001603 A1 | 1/2011 | Willis | |
| 2011/0040585 A1 | 2/2011 | Roxburgh | |
| 2011/0068165 A1 | 3/2011 | Dabosville | |
| 2011/0078440 A1 | 3/2011 | Feng | |
| 2011/0136472 A1 | 6/2011 | Rector | |
| 2011/0153495 A1 | 6/2011 | Dixon | |
| 2011/0251910 A1 | 10/2011 | Dimmick | |
| 2011/0283241 A1 | 11/2011 | Miller | |
| 2011/0307381 A1 | 12/2011 | Kim | |
| 2012/0006891 A1 | 1/2012 | Zhou | |
| 2012/0030047 A1 | 2/2012 | Fuentes | |
| 2012/0092190 A1 | 4/2012 | Stefik | |
| 2012/0133484 A1 | 5/2012 | Griffin | |
| 2012/0136698 A1 | 5/2012 | Kent | |
| 2012/0166298 A1* | 6/2012 | Smith | G06Q 20/209 705/24 |
| 2012/0245769 A1 | 9/2012 | Creissels | |
| 2012/0330697 A1 | 12/2012 | Smith | |
| 2013/0103200 A1 | 4/2013 | Tucker | |

(56) References Cited

U.S. PATENT DOCUMENTS

| | | | |
|---|---|---|---|
| 2013/0124236 A1 | 5/2013 | Chen | |
| 2013/0194202 A1 | 8/2013 | Moberg | |
| 2013/0204647 A1 | 8/2013 | Behun | |
| 2013/0214906 A1 | 8/2013 | Wojak | |
| 2013/0279757 A1 | 10/2013 | Kephart | |
| 2013/0307990 A1 | 11/2013 | Wiles | |
| 2014/0086125 A1 | 3/2014 | Polo | |
| 2014/0100896 A1 | 4/2014 | Du | |
| 2014/0156318 A1 | 6/2014 | Behun | |
| 2014/0186050 A1 | 7/2014 | Oshima | |
| 2014/0279558 A1 | 9/2014 | Kadi | |
| 2015/0020181 A1* | 1/2015 | Iwata | G06F 21/32 726/7 |
| 2015/0025921 A1 | 1/2015 | Smith | |
| 2015/0084741 A1 | 3/2015 | Bergdale | |
| 2015/0213443 A1* | 7/2015 | Geffon | G06Q 20/3821 705/76 |
| 2015/0213660 A1 | 7/2015 | Bergdale | |
| 2015/0317841 A1 | 11/2015 | Karsch | |
| 2016/0042631 A1 | 2/2016 | Ho | |
| 2016/0055605 A1 | 2/2016 | Kim | |
| 2016/0093127 A1 | 3/2016 | Evans | |
| 2016/0253675 A1* | 9/2016 | Remillet | G06F 21/31 705/44 |
| 2016/0358332 A1* | 12/2016 | Watanabe | G06T 7/0012 |
| 2017/0032114 A1* | 2/2017 | Turgeman | G06F 21/32 |
| 2017/0055157 A1 | 2/2017 | Bergdale | |
| 2017/0372289 A1* | 12/2017 | Fitzsimmons | G06Q 20/208 |

FOREIGN PATENT DOCUMENTS

| | | |
|---|---|---|
| GB | 2417358 | 2/2006 |
| JP | H11145952 A | 5/1999 |
| JP | 2003187272 A | 7/2003 |
| RU | 94931 | 6/2010 |
| TW | 200825968 A | 6/2008 |
| WO | 2007139348 A1 | 12/2007 |
| WO | 2008113355 | 9/2008 |
| WO | 2009141614 | 11/2009 |
| WO | 2011044899 | 4/2011 |
| WO | 2014043810 | 3/2014 |
| WO | 2014189068 | 11/2014 |
| WO | 2016105322 | 6/2016 |

OTHER PUBLICATIONS

Starnberger et al., "QR-TAN: Secure Mobile Transaction Authentication," area, pp. 578-583, 2009 International Conference on Availability, Reliability and Security, 2009.

Scott Boyter, "Aeritas tried to fill void until 3G wireless is ready; Mobile boarding pass is just one application being tested", all pages, Dallaw Forth Worth TechBiz, Feb. 19, 2001.

Joanna Elachi, "Lufthansa Debuts Barcode Check-in and Boarding", all pages, CommWeb.com, May 25, 2001.

"Aeritas launches secure wireless check-in with barcode", all pages, m-Travel.com, Nov. 9, 2001.

"Aeritas Launches Wireless Check-in and Security Service", all pages, MBusiness Daily, Nov. 8, 2001.

"New Fast Track Wireless Check-In and Security Solution", all pages, aerias.com, retrieved Feb. 5, 2002.

Hussin, W.H.; Coulton, P; Edwards, R., "Mobile ticketing system employing TrustZone technology" Jul. 11-13, 2005.

Jong-Sik Moon; Sun-Ho Lee; Im-Yeong Lee; Sang-Gu Byeon, "Authentication Protocol Using Authorization Ticket in Mobile Network Service Environment" Aug. 11-13, 2010.

Stephanie Bell, "UK Rail Network to Launch Mobile Train-Ticketing Application" Cardline, Feb. 4, 2011.

Ko Fujimura, Yoshiaki Nakajima, Jun Sekine: "ML Ticket: Generalized Digital Ticket Definition Language" Proceedings of the 3rd Usenix Workshop on Electronic Commerce, Sep. 3, 1998.

Chun-Te Chen; Te Chung Lu, "A mobile ticket validation by VSS teach with timestamp" Mar. 28-31, 2004.

Improvement of urban passenger transport ticketing systems by deploying intelligent transport systems, 2006.

Machine English translation of JP2003-187272A from U.S. Appl. No. 13/901,243.

\* cited by examiner

Figure 7

| Venue ID |
|---|
| Username |
| Password |

…

METHOD AND SYSTEM FOR DISTRIBUTING ELECTRONIC TICKETS WITH VISUAL DISPLAY FOR VERIFICATION

This application claims priority to U.S. patent application Ser. No. 13/901,243 filed May 23, 2013 as a continuation and incorporates that application by reference in its entirety and is a continuation of U.S. patent application Ser. No. 13/475,881 filed on May 18, 2012, which further claims priority to U.S. patent application Ser. No. 13/110,709 filed on May 18, 2011 as a Continuation in Part and hereby incorporates that application by reference in its entirety. This application also claims priority to U.S. patent application Ser. No. 13/046,413 filed on Mar. 11, 2011 as a Continuation in Part and hereby incorporates that application by reference in its entirety.

FIELD OF INVENTION

This invention provides a mechanism whereby a venue or other facility that meters usage by means of tickets can distribute tickets electronically and use a visual aid on an electronic device to visually confirm that a person is a valid ticket holder.

BACKGROUND

Venues such as theaters, amusement parks and other facilities that use tickets, for example airlines, ferries and other transportation have a need to use electronic ticketing. Existing systems distribute information that can constitute a ticket, but the verification problem is difficult. In one example of prior art, an electronic ticket is displayed as a bar-code on the recipient's telephone display screen. The telephone is then placed on a scanner that reads the bar-code in order to verify the ticket. The problem with these systems is that the scanning process is fraught with error and the time taken to verify the electronic ticket far exceeds that of the old system: looking at the paper ticket and tearing it in half. Barcode scanners were not designed to read a lit LCD screen displaying a bar code. The reflectivity of the screen can defeat the scanning process. Therefore, there is a need for an electronic ticketing system that provides a human-perceivable visual display that the venue can rely on to verify the ticket. This invention provides for the distribution of an electronic ticket that also contains a visual display that ticket takers can rely on as verification, without using a scanning device.

DESCRIPTION OF THE FIGURES

FIG. 7. Schematic of authorized user database record.

DETAILED DESCRIPTION OF THE PREFERRED EMBODIMENTS

Figure 1:
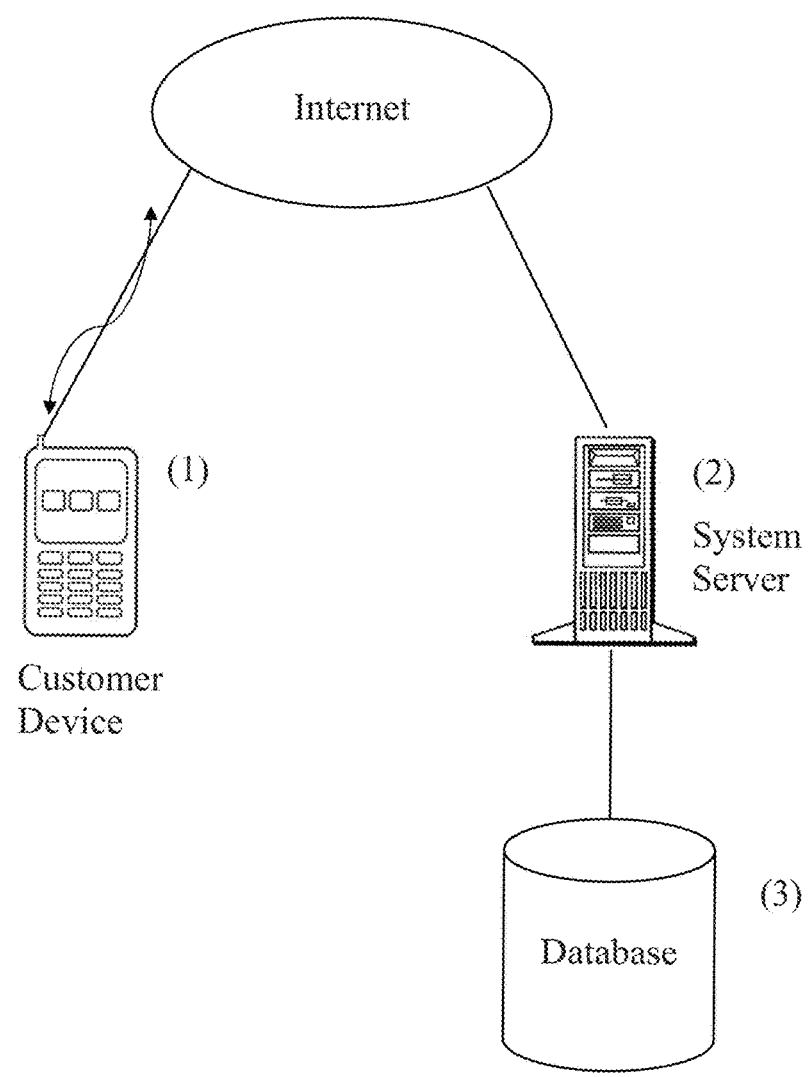
FIG. 1. Basic architecture.
Figure 2:
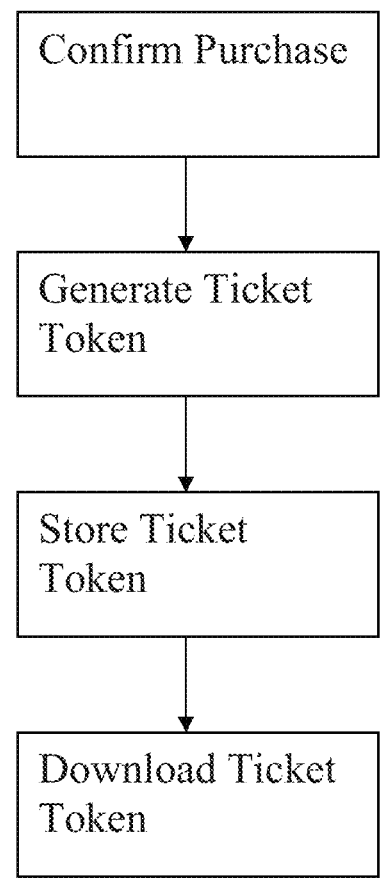
FIG. 2. Flow chart for ticket purchase.
Figure 3:
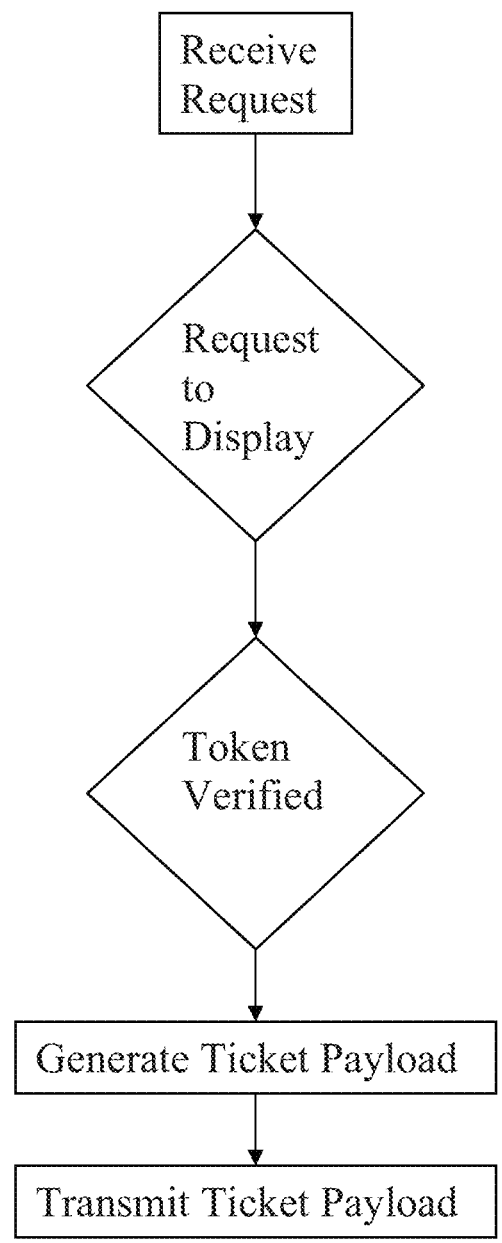
FIG. 3. Flow chart for displaying the verifying visual object.
Figure 4:
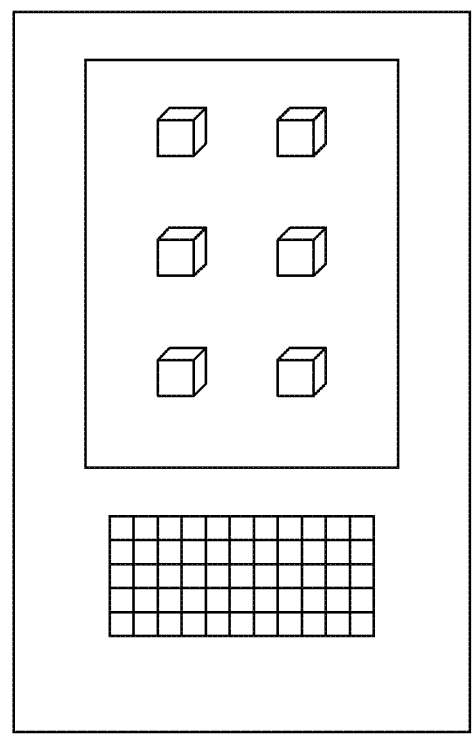
FIG. 4. Example validating visual object.
Figure 5:
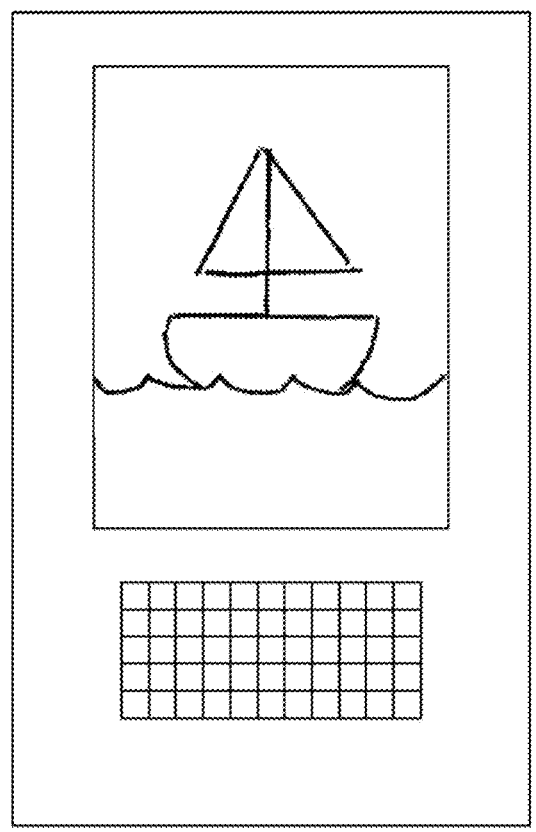
FIG. 5. Example validating visual object
FIG. 6. Schematic of event database record.

The system operates on one or more computers, typically one or more file servers connected to the Internet and also on a customer's computing device. A customer's device can be a personal computer, mobile phone, mobile handheld device like a Blackberry™ or iPhone™ or any other kind of computing device a user can use to send and receive data messages. The customer's device is used to display the validating visual object.

Conventional electronic tickets display a barcode or QR code on a user's telephone, typically a cellphone or other portable wireless device with a display screen. The problem with this approach is that a barcode scanner has to be used by the ticket taker. Barcode scanners are not highly compatible with LCD screen displays of barcodes. The amount of time that it takes to process an electronic ticket is greater than that of a paper ticket. Sometimes the LCD display does not scan at all and a passenger has to be sent away to get a paper printout of a ticket. Given the potential large crowds that often attend open venues, this is impractical.

In this invention, the ticket is procured electronically and stored on the user's device. However, when the ticket is to be taken the verification is determined by a larger visual object that a human can perceive without a machine scanning it. The particular validating visual object chosen can be constantly changed so that the ticket taker does not have to be concerned that a device displaying the designated validating visual object is invalid. There are many types of visual objects that can be displayed that are easily recognized by a ticket taker. These can include but are not limited to: Patterns of color change, Animations and Geometric patterns. In one embodiment, the validating visual object that is transmitted can be computer code, that when executed by the device, causes the user device to display the desired visual pattern. In another embodiment, the validating visual object is a command that specifies what the visual pattern should be. In that embodiment, the program operating on the user's device receives the command instruction, decodes it, and determines what visual patterns to generate based on the data in the command instruction. In another embodiment, the validating visual object is video or image data transmitted directly from the server to the device for immediate display.

In one embodiment of the invention, the user purchases a ticket from an on-line website. The website sends to the user's device a unique identifier, referred to as a token. The unique identifier may be alphanumeric, contain special characters, a byte array, hexadecimal value, string and may include symbols, such as a slash or an asterisk. The term "unique identifier" is intended to include any combination of numbers, byte arrays, hexadecimal values, strings, characters, symbols or the like. The unique identifier may point to only one record and a given record may have one or more static or dynamically generated identifiers. The present invention also envisions that the unique identifier may point to one or more records and a given record may have one or more static or dynamically generated identifiers. The token is also stored in the ticketing database. When the time comes to present the ticket, the venue can select what visual indicator will be used as the designated validation visual object. The user can then request the validation visual object. The user's device will have an application that launches a user interface. The user can select "validate" or some other equivalent command to cause the application to fetch and download from the ticketing system a data object referred to herein as a ticket payload, which includes a program to run on the user's device. In another embodiment, the ticket payload can be pushed to the device by the venue. As a result, the application transmitted to the user's device is previously unknown to the user and not resident in the user's device. At that point the user's device can execute the program embodied in the ticket payload, which causes the validation visual object to be displayed on the user's device. The ticket taker knows what the validating visual object is, and simply looks to see that the user's device is displaying the correct visual object.

Piracy is limited in several ways. First, the ticket holder and their device does not have access to the validating visual object until a time select to be close to the point in time where the ticket has to be presented. Second, the validating visual object is one of an very large number of permutations and therefore cannot be guessed, selected or copied ahead of time. Third, the ticket payload can contain code that destroys the validating visual object in a pre-determined period of time after initial display or upon some pre-determined input event. Fourth, a number of security protocols can be utilized to ensure that a copy of the application that executes to display the validating visual object cannot be readily copied or reverse engineered.

Validating Visual Object Displays:

There many kinds of validation displays that can be utilized. The criterion for what constitutes a validating visual object is one that is readily recognizable from human observation, is encapsulated in such a way as to be transmitted to the customer's device with a minimum of network latency or download time, and that can be reasonably secured so as to avoid piracy.

Barcodes and similar codes like the QR code are not validating visual objects because a person looking at them cannot tell one apart from another. Instead, the person has to rely on a barcode scanner and computing device to verify the barcode.

In one embodiment, the period that a particular validating visual object may be used is automatically limited. Examples of validating visual objects include:
1. A color display on the device.
2. A color sequence.
3. An animation that is easily recognized.
4. Animations can include easily recognizable geometric patterns, for example an array of diamonds, or an array of rotating cubes.
5. A human recognizable image.
6. The customer's face as an image.
7. Combinations of the above.

In another embodiment, other images, for example, block letter, can be displayed so that additional information readily apparent to the ticket taker is displayed. For example, a letter can be designated for a Child ticket or a different letter for an Adult ticket.

Referring now to FIG. 1, the customer uses their device (1) to purchase a ticket from the service operating the system server (2) and database (3).

Figure 7:
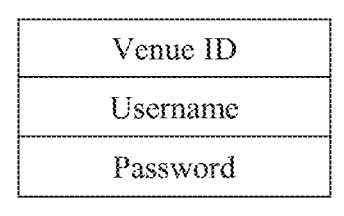

In one embodiment, an authorized user associated with the venue, typically the box office manager, logs into the back-end system through a secure web-page. The authorized user can enter the web-page by entering a username, password and venue identifier. The system maintains a database (3) that associates the venue identifier with a set of usernames and password pairs that are authorized to use the system on behalf of the venue. See FIG. 7. The system checks the database (3) to verify that the venue ID, username and password are consistent with each other. The authorized user can navigate through to a point in the system user interface where a particular show may be selected for ticket taking. The user selects the upcoming show, and then selects from a display of possible validating visual objects. The validating visual object is transmitted to a device viewable by ticket taking staff at the entrances to the venue. The staff then can see the authorized object to accept for the upcoming show.

Figure 6:
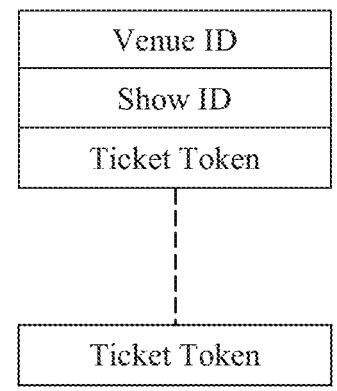
Figure 8:
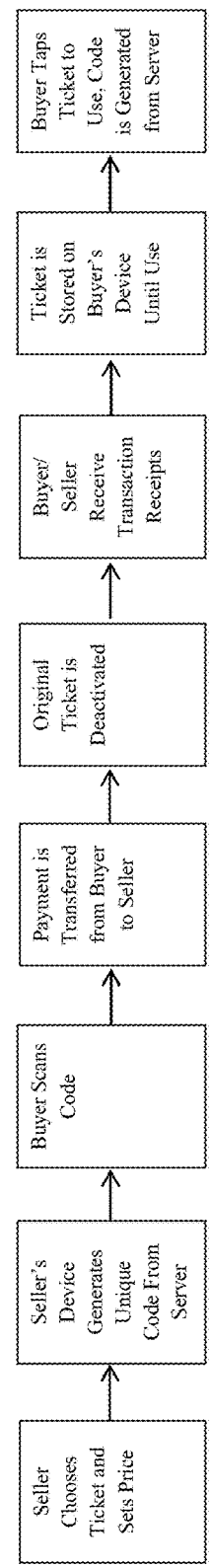
FIG. 8. Flow chart for transfer of ticket.

Ticket holders that have purchased tickets have a data record in the system database that contains the unique token associated with the ticket and other relevant information, including the venueID and an identifier identifying the specific show the ticket is for. See FIG. 6. At the entrance, customers are requested to operate an application on their devices. This application fetches the stored ticket token and transmits that token to the system, preferably over a secure data channel. The database looks up the token to check that the token is valid for the upcoming show. If the token is valid, then the system transmits back to the device a ticket payload. The ticket payload contains computer code that, when operated, displays the selected validating visual object.

Figure 9:
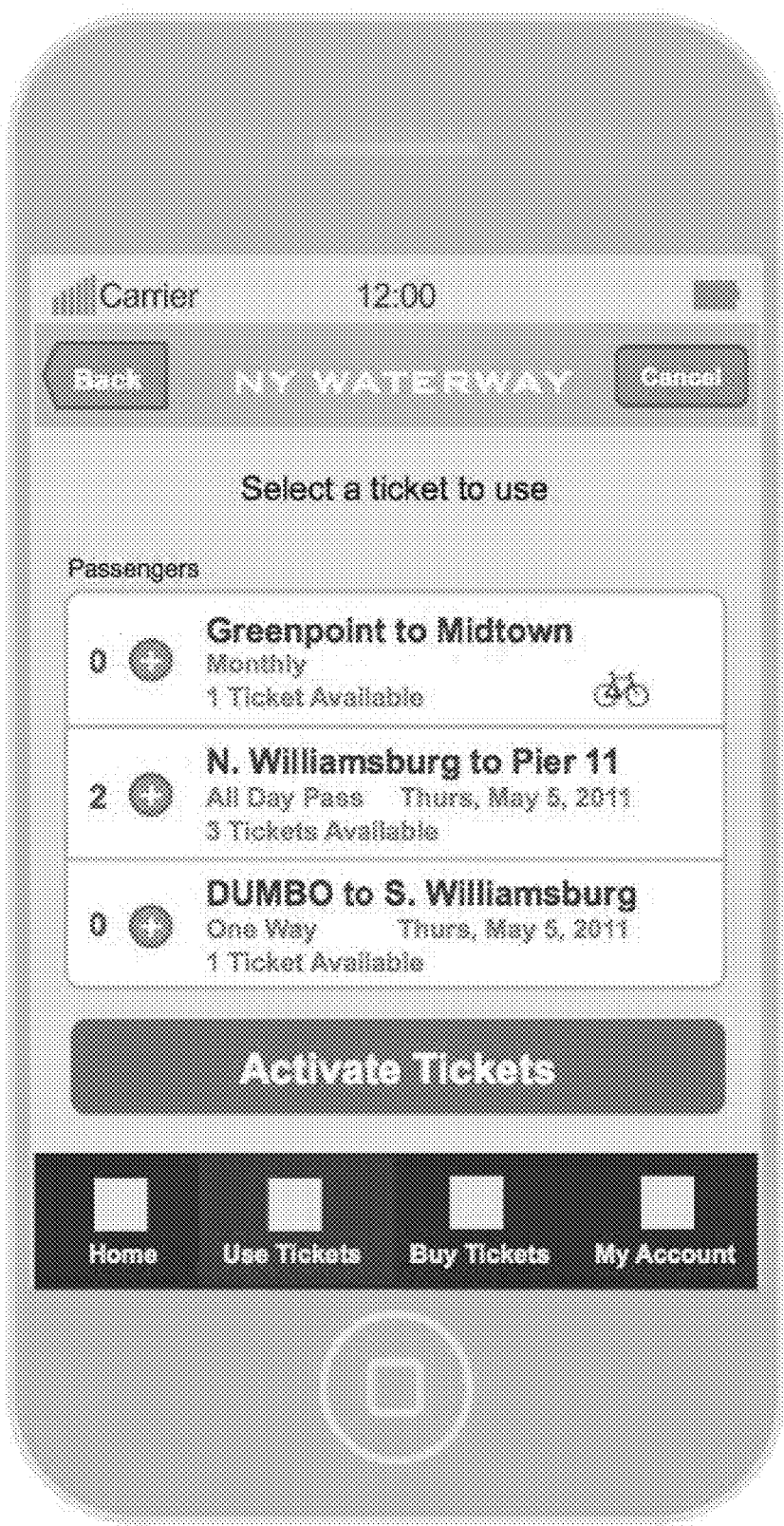
FIG. 9. Example user interface on user's device.
Figure 10:
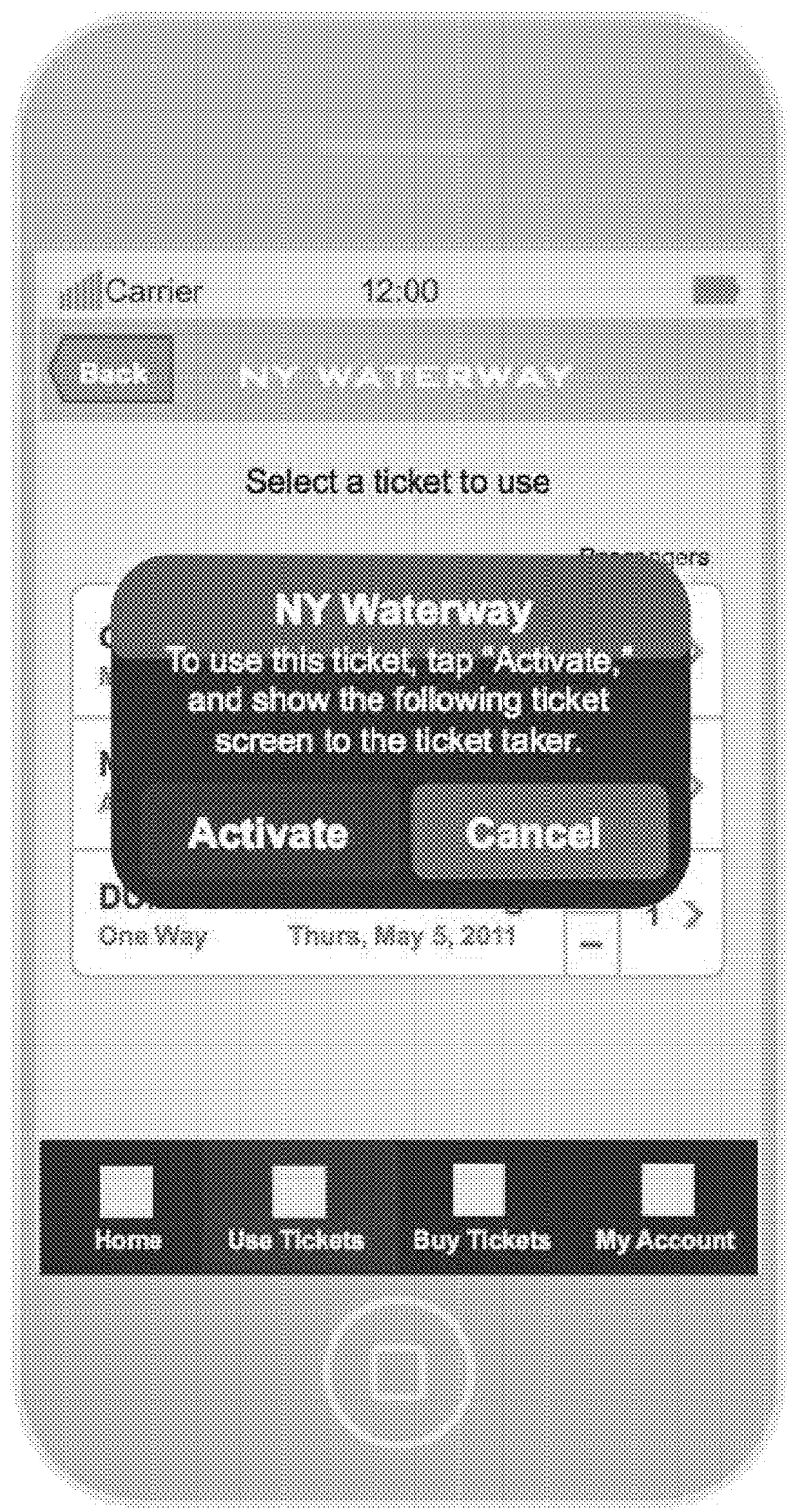
FIG. 10. Example user interface showing activation selection screen.
Figure 11:
FIG. 11. Example user interface showing display of validating visual object and other ticketing information.

The customer can navigate the user interface of the application in order to cause the application to request whether to display the validating visual object. As shown in FIG. 9, one or more available tickets can be displayed on the user interface, which provides the user the ability to select one of the tickets. When the customer properly actuates the user interface, for example, by actuating the "Activate Tickets" button (see FIG. 10), the validating visual object is displayed on the screen of the device. The animation can be presented along with other ticketing information (see FIG. 11). In one embodiment, the device transmits the ticket token to the system with a command indicating that the ticket has been used. In another embodiment, the customer can operate the application and request that the application transmit to the database the condition that the ticket was used. In that embodiment, the user can input a numeric code or password that the application uses to verify that the customer is confirming use of the ticket. In yet another embodiment, after the validating visual object has been launched, a predetermined amount of time later it can be deemed used. At that time, the application can cause the color of the object to be changed so that it indicates that there was a valid ticket, but the ticket was used. This condition is useful in cases where the venue checks tickets during shows while letting customers move around the venue's facilities.

In another embodiment, the purchase of the ticket causes the ticket payload to be downloaded to the customer's device. Likewise, the authorized user for the venue will select a validating visual object for a particular show well in advance of the show. In this case, because a customer may possess the payload some time before its use, precautions must be taken to secure the ticket payload from being hacked so that any similar device can display the validating visual object. While this is a security tradeoff, the benefit is that the customer need not have an Internet connection at a time close to the showtime of the venue.

The use of electronic ticketing provides opportunities that change how tickets can be bought and sold. For example a first customer can purchase a ticket and receive on their device a ticket token. A second customer can purchase that ticket using the system. The first customer can use the application to send a message to the system server indicating that the first customer intends to the web-page indicating that it wants to buy that particular ticket. The system can ask the first customer for a username and password to be associated with the first customer's ticket. If the second customer identifies the first customer's username, the system then can match the two together. At that point, the data record associated with the first customer's ticket is modified so that the ticket token value is changed to a new value. That new ticket token value is then transmitted to the second customer's device. At the same time, the system can operate a typical on-line payment and credit system that secures payment from the second customer and credits the first customer. In one embodiment, the system pays the first customer a discounted amount, retaining the balance as a fee.

In yet another embodiment, the first customer may be unknown to the second customer. In that embodiment, the first customer simply may indicate to the system, through a message transmitted from the application operating on the device or directly through a web-page, that the first customer is not going to use the ticket and wishes to sell it. At that point, the system can mark the data record associated with the ticket as "available for sale." When the second customer makes a request to purchase a ticket for the same show, the system creates a new ticket token for the second customer and updates the ticket token stored in the data record.

In a general admission type of scenario, the ticketing database is simple: each show has a venue ID, some identifier associated with the show itself, various time indicators, the selected validating visual object, and a list of valid ticket tokens. In a reserved seating arrangement, the ticketing database has a data record associated with a show, as indicated by a show identifier, but each seat has a data record that has a unique show identifier and ticket token, which includes the identity of the seat itself.

In the preferred embodiment, the validating visual object is secured against tampering. One threat model is that a customer who has received a ticket payload would then take the data file comprising the ticket payload and analyze it to detect the actual program code that when executed, produces the validating visual object on the display screen of the device. Once that has been accomplished, the would-be pirate can then re-package the code without any security mechanism and readily distribute it to other device owners, or even cross-compile it to execute on other types of display devices. The preferred embodiment addresses this threat model in a number of ways.

First, the ticket payload can be secured in a region of the device under the control of the telecommunications provider. In this case, the customer cannot access the code comprising the ticket payload. In another embodiment, the ticket payload can be encrypted in such a way that the only decrypting key available is in the secure portion of the telecommunications device. In that embodiment, the key is only delivered when an application running on the secure part of the device confirms that the ticket payload that is executing has not been tampered with, for example, by checking the checksum of its run-time image. At that point, the key can be delivered to the ticket payload process so that the validating visual object is displayed on the device.

Second, the selected animation is packaged for each device. That is, the code that operates to display the validating visual object itself operates certain security protocols. The phone transmits a ticket transaction request. The request includes a numeric value unique to the device, for example, an IMEI number. Other embodiments use the UDID or hardware serial number of the device instead of or in combination with the IMEI number. The system server then generates the ticket token using the IMEI number and transmits that value to that device. In addition, the ticket payload is created such that it expects to read the correct IMEI number. This is accomplished by the system server changing portions of the ticket payload so that the it is customized for each individual IMEI number associated with a ticket token. The animation code comprising the ticket payload is designed so that it has to obtain the correct IMEI number at run time. In another embodiment, at runtime, the animation code will read the particular ticket token specific for the phone that instance of the animation was transmitted to. The code will then decode the token and check that it reflects the correct IMEI number for that device.

In another embodiment, the security protocol first requires the user to login to the server with a login username and password. The application also transmits the IMEI, UDID or serial number of the device or any combination of them. When verified by the server, an authorization key (Authkey) is transmitted to the device. The Authkey is a random number. When the user's application transmits a request for a validating visual object, it transmits the Authkey and the IMEI, UDID or serial number (or combination) that is used for verification. This is checked by the server for validity in the database. On verification, the validating visual object is encrypted using the Authkey and transmitted to the device. The application running on the device then uses the Authkey to decrypt and display the validating visual object. The Authkey is a one-time key. It is used once for each ticket payload. If a user buys a second ticket from the system, a different, second Authkey is associated with that second ticket payload. In one embodiment, the Authkey is unique to the ticket for a given event. In another embodiment, the Authkey is unique to the ticket, device and the event. In other embodiments, the Authkey can be replaced with a key-pair in an assymetric encryption system. In that case, the validating visual object is encrypted with a "public" key, and then each user is issued a private key as the "Authkey" to be used to decrypt the object.

In yet another embodiment, the Authkey can be encrypted on the server and transmitted to the device in encrypted form. Only when the application is operating can the Authkey be decrypted with the appropriate key. In yet another embodiment, the application that displays the validating visual object can request a PIN number or some other login password from the user, such that if the device is lost, the tickets cannot be used by someone who finds the device.

In another embodiment, the application running on the device can fetch a dynamic script, meaning a piece of code that has instructions arranged in a different order for subsets of devices that request it. The ticket payload is then modified so as to have the same number of versions that are compatible with a corresponding variation in the dynamic script. As a result, it is difficult to reverse engineer the application because the application will be altered at run time and the ticket payload customized for that alteration. One embodiment of the dynamic script would be expressed in Java™ computer language and rendered using OpenView. The ticket payload can be an HTML file called using Ajax.

Security can also be enhanced by actively destroying the validating visual object so that it resides in the device for a limited time. In one embodiment, the ticket payload has a time to kill parameter that provides the application with a count-down time to destroy the validating visual object. In another embodiment, the validating visual object is displayed when the user holds down a literal or virtual button on the user interface of the device. When the button is released, the application destroys the validating visual object.

Security can also be enhanced by retaining as steganographic data embedded in the validating visual object, the IMEI, UDID, Serial number or phone number of the device. The application can be operated to recover that information and display it on the screen. This makes it possible for security personnel at a venue to view that information from a validly operating device. If the device is showing a pirated validating visual object, then the actual data associated with the device will not match and it will be apparent from inspection of the device. This way, suspicious ticket holders can be subject to increased scrutiny, the presence of which deters piracy.

In another embodiment, the ticket payload can operate a sound sampling application that requests the customer to speak in to the device. The application can then use that data to check whether the voice print of the speaker matches the expected voice print. In yet another embodiment, the device can take a picture of the customer's face, and then facial recognition code embedded in the ticket payload can operate to check whether the features of the face sufficiently match a pre-determined set of features, that is, of the customer's face at the time the ticket was purchased. In yet another embodiment, the verification can be supplemented by being sure that the use of the ticket is during a pre-determined period of time. In yet another embodiment, the verification can be supplemented by the ticket payload operating to check that the location of the venue where the ticket is being used is within a pre-determined range of tolerance to a GPS (Global Positioning System) location. In yet another embodiment, after a certain pre-determined number of downloads of ticket payloads for a specific show, the validating visual object is automatically changed. This last mechanism may be used for promotions, to select the first set of ticket buyers for special treatment at the venue. In yet another embodiment, two different validating visual objects may be used, which are selected based on the verified age of the customer. In this way, a venue can use the system to not only to verify ticket holders coming into the venue, but to verify their drinking age when alcoholic drinks are ordered.

Figure 12:
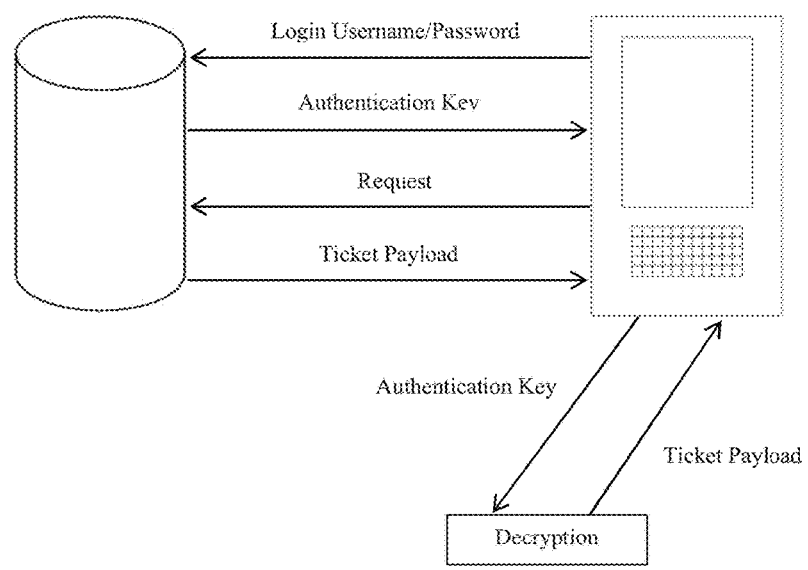
FIG. 12. Flowchart for ticket activation process.

In yet another embodiment, the system's servers control the ticket activation process. FIG. 12. In this embodiment, the token is generated randomly by the user's mobile computing device and then transmitted to and stored on the system server as a result of the user's request to activate the ticket. When the server receives a request to activate a ticket, the server checks whether there is already an activation token stored in its database that corresponds to that ticket. The token is stored in a data record associated with the user that is activating the ticket. The user logs into the account and then requests that a ticket be activated. If it is, then it checks whether the token received from the user's mobile device matches the stored token. That is, it authenticates against that stored token. If the user's request for activation is the first activation of the ticket, then the server stores the received token into the data record associated with the user's account and keeps it there for a predetermined period of time, in order to lock the ticket to that device for that period of time. This process locks a ticket to that unique token for that lock period. Typically this will lock the ticket to the user's mobile computing device. If the stored token does not match the token received from the user's computing device, the ticket activation is denied.

The predetermined lock time permits a reusable ticket to be locked to a device for the predetermined lock time. This is useful in the event the user changes the mobile computing device that the user uses to the ticket. For example, a monthly train commuting ticket would be activated once each day, and would remain activated for the day of its activation. In this case, the user would validate the ticket once each day, and that activation would be locked to the device for the day. The next day, the user would be able to activate the ticket using a different mobile computing device if the predetermined time locking the activation has expired, that is, if the data record associated with the ticket has been automatically reset into an deactivated state. The activation process also permits a user account to be shared within a family, for instance, but that each ticket sold to that account to be locked to one device.

Figure 13A:
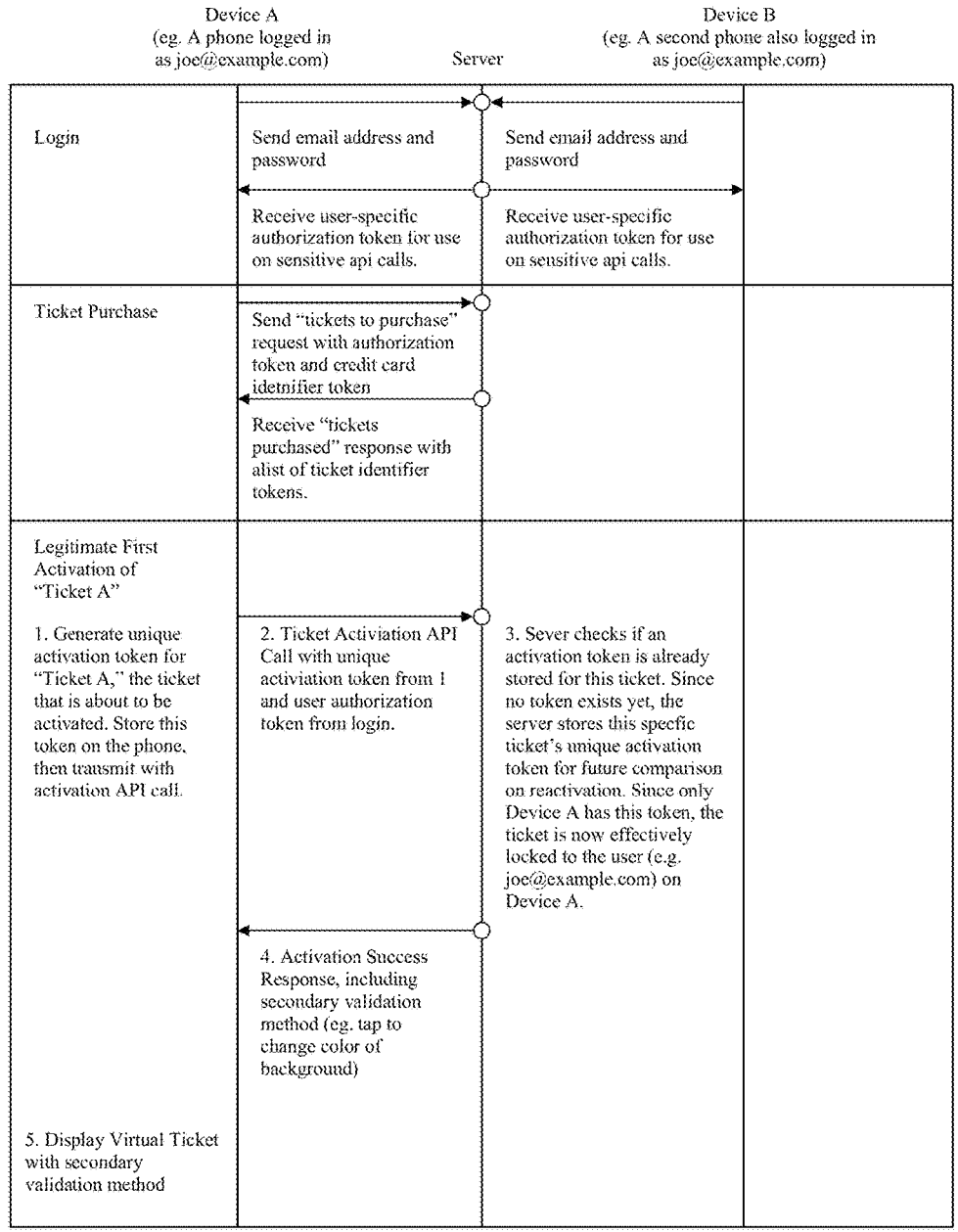
FIG. 13a. Protocol diagram for activation process.
Figure 13B:
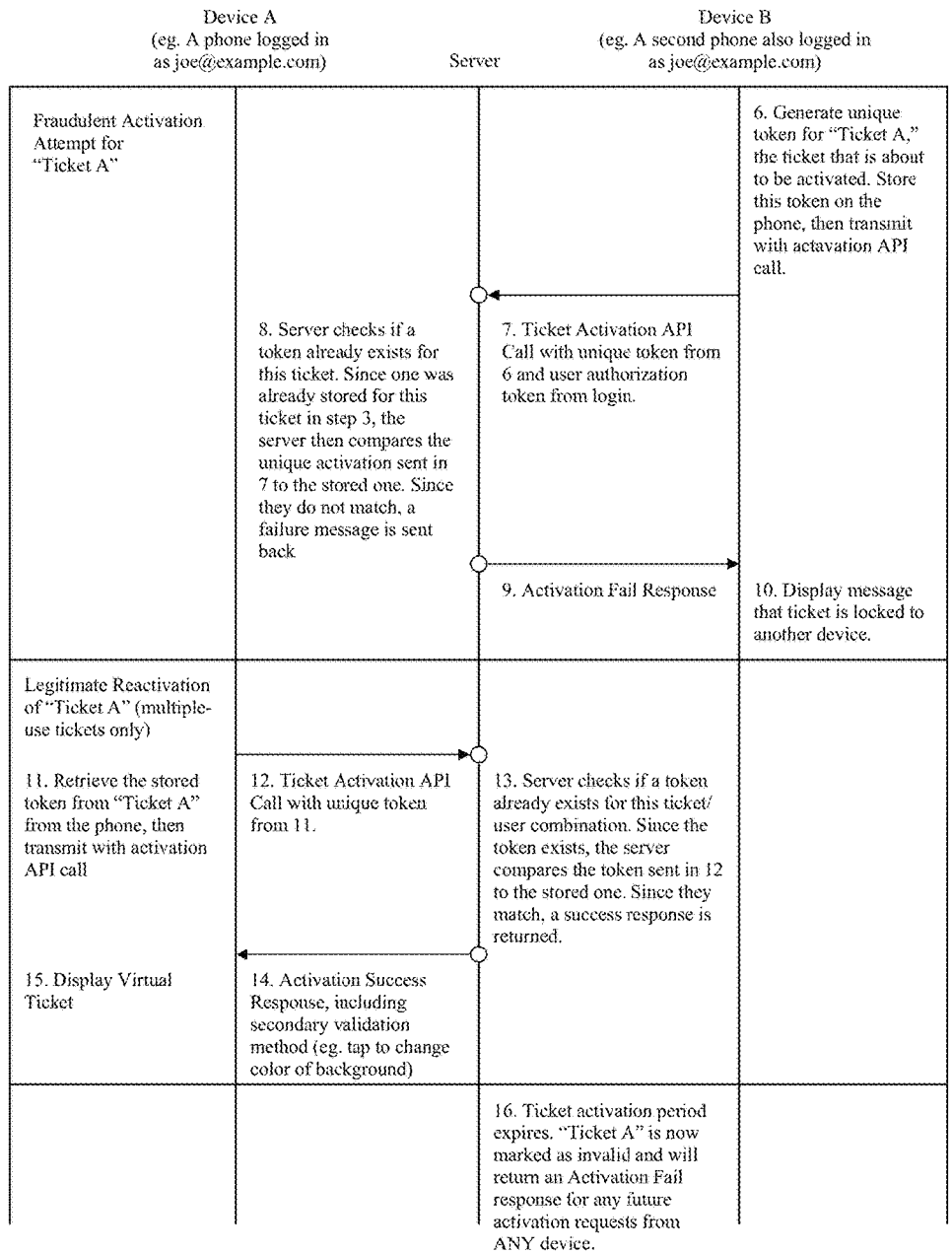
FIG. 13b. Continued protocol diagram for activation process.

As depicted in the protocol diagrams FIGS. 13a and 13b, the user can use their mobile computing device to request that their ticket get activated for the first time. However, once that activation process has occurred, the server will store the unique token received from the activating user's computing device in the database in a manner that associates it with the ticket and the user's account. If another user associated with the account attempts to use the ticket by activating it, a different random token will be transmitted to the server. Because these two tokens do not match, the second activation will be prohibited.

The activation process can also permit a ticket to be shared. In this embodiment, the user who has activated the ticket can submit to the server a request that the ticket be transferred to another user. For example, a data message can be transmitted from the user's device to the system that embodies a request to move the ticket to another user. In that case, the stored token is marked as blocked, or is equivalently considered not present. This is accomplished by storing a data flag in the database that corresponds to the ticket. One logic state encodes normal use and the opposite logic state encodes that the ticket has been shared. A data message may be transmitted to the second user indicating that the ticket is available for activation. The second user may submit a request to activate the ticket and a random token value is transmitted from the second user's device to the server. That second token value is checked to see if it's the first activation. Because the first user has activated the ticket, but then transferred it, the activation by the second user is not blocked. That is, the server detects that the first token is now cancelled or equivalently, the system has returned to the state where the first activation has not occurred and therefore permits the new activation to take place. The new activation can also have a predetermined time to live value stored in the database that is associated with it. In this case, the activation by the second user expires and the second user can be prevented from reactivating the ticket. At the same time, the flag setting that disables the first token can be reset, thereby setting the ticket up for reactivation by the first user. By this mechanism, it is possible for the electronic ticket to be lent from one user to another.

In yet another embodiment, the ticket activation process can open a persistent connection channel over the data network that links the server and the user's mobile computing device. In this embodiment, if the activation of the ticket and therefore the device is successful, the server can maintain a persistent data channel with a computer process running on the user's computing device. In this embodiment, the request for ticket activation causes the user computer device to open the persistent channel. In this embodiment, the server establishes a communication process operating on the server that receives data and then causes that data to be automatically routed to the user's computing device. The process on the user's mobile computing device can thereby automatically respond to that received data. In tandem, the computer process operating on the users computing device can send data directly to the server process associated with that user's session. For a server servicing many user devices, there will be one persistent channel established between the server and each mobile device that has an activated ticket.

The persistent channel between the server and the user's computer device can be used in a variety of ways. In the preferred embodiment, the persistent connection is designed so that that it maintains a bi-directional, full-duplex communications channel over a single TCP connection. The protocol provides a standardized way for the server to send content to the process operating on the user's computing device without being solicited by the user's device each time for that information, and allowing for messages to be passed back and forth while keeping the connection open. In this way a two-way (bi-direction) ongoing interaction can take place between a process operating on the user's computing device the server. By means of the persistent channel, the server can control the activity of the user computer device. For each user computing device, there can be a distinct persistent connection.

Figure 14:
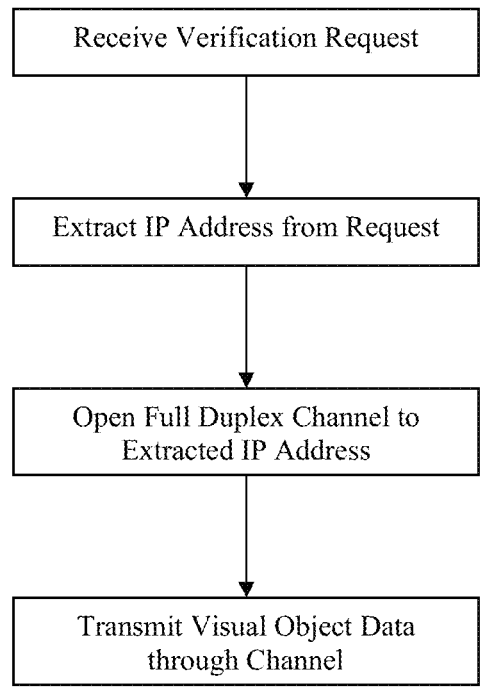
FIG. 14. Flowchart for persistent channel.

In one embodiment, the persistent connection is established when the user requests an activation of a ticket. See FIG. 14. In other embodiments, it can be used if the system is used to verify payment of a purchase price. In either case, the user computing device transmits a request message to the server. For each user computing device, there can be a distinct persistent channel. Each persistent channel has a label or channel name that can be used by the server to address the channel. In the case of ticketing, when the ticket is activated the data representing the validating visual object can be transmitted in real time from the server to the user computing device and immediately displayed on the device. This provides an additional method of securing the visual ticketing process. In this case, when the ticket is activated and the persistent channel is created, the label of the channel is stored in the database in a data record associated with the user and the ticket. When the server transmits the validating visual object for that ticket, it fetches from the database the label of the channel and then uses that label to route the transmission of the validating visual object. The use of the persistent channel causes the user computer device to immediately and automatically act on the validating visual object. In one embodiment, the receipt of the validating visual object causes the receiving process to immediately in response interpret the command and select and display the required visual pattern. In another embodiment, the process receives a block of code that the process calls on to execute, and that code causes the visual pattern to be displayed. In yet another embodiment, the process receives image or video data and the process passes that data on to the user device screen display functions for presentation on the user device screen.

In another embodiment, a validating visual object can be transmitted to the user's computing device to be automatically displayed on the screen without the user having to input a command to cause the display. That visual object can be displayed by the user computing device. For additional security, the server can transmit to the user computing device a visual object that contains the channel name or a unique number that the server can map to the channel name. For clarity, this additional visual object is not necessarily used for visual verification by ticket takers, as explained above. This visual object can be used by other machinery to confirm the ticket purchase transaction or even other transactions not directly related to the purchase of the ticket. The additional visual object can be in the form of a QR code, barcode or any other visual object that can be scanned, for example at a point of sale system, and from that scanned image, an embedded data payload extracted. In that visual object, data can be embedded that uniquely identifies the source of the scanned object. The channel name of the persistent channel or a number uniquely mapped on the server to identify the channel can be embedded in that scanned object.

Figure 15:
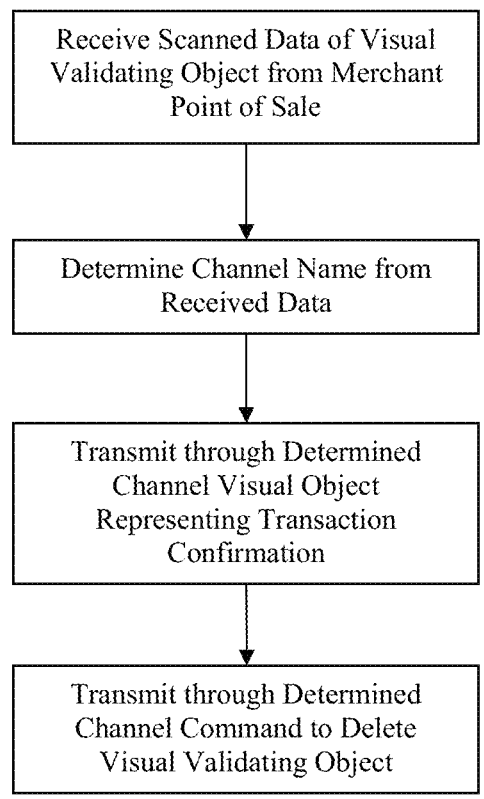
FIG. 15. Flowchart for persistent channel for purchase verification.

In one embodiment, as shown on FIG. 15, a merchant can use a point of sale system operated by the merchant to scan the display screen of the user's computing device. That point of sale system can then capture from the scanned image the channel name or a unique number that is uniquely mapped on the server to the channel name. That information is transmitted to the server as a challenge for verification. The received challenge data is checked to see if it matches the channel name or corresponding unique number used to transmit the visual object that the merchant scanned. If they match up, there is a verification of a transaction. This exchange provides verification that the user's device is present at the merchant location and that a transaction with the merchant should be paid for.

In yet another embodiment, the persistent connection provides a means for the server to control the actions of the process operating on the user's computer device that is at the other end of the connection. In this embodiment, the server can automatically transmit a command to the process on the user's computing device that automatically deletes the verifying visual object that has been transmitted to ensure that it cannot be reused or copied.

In one embodiment, the persistent connection is used to automatically transmit visual information to the user's mobile computing device and to cause that information to be displayed on the screen of the device. The visual information can be the validating visual object or any other visual object that the server selects to transmit for display. In this embodiment, the persistent connection can be used by the server to transmit other information to the user's device. In this embodiment, the server transmits text, images, video or sound and in some cases in combination with other HTML data. In another embodiment, this material comprises advertising that the server selects to display on the user's device. The selection process can utilize the GPS feature described above to determine the approximate location of the user's device and then based on that location, select advertising appropriate to be transmitted to that device. In yet another embodiment, the server selects the advertising content by determining predetermined features of the validated ticket or purchasing transaction and then making a selection on the basis of those features. For example, a validation of a ticket to a baseball game played by a team specified in the data associated with the validated ticket may cause the selection of an offer to purchase a ticket for the next baseball game of the same team. In yet another embodiment, the character of the transaction being verified can be used to cause the selection of advertising or the transmission of data comprising a discount offer related to the transaction.

In this embodiment, the server receives from the merchant the data that determines the persistent channel. The merchant, by relying on the system for payment will also transmit transaction details, for example, an amount of money and an identity of goods or services. When the channel name or unique number associated with the channel is matched for verification, the server can transmit data representing a confirmation display down to the user's device using the persistent connection. This data is received by the user computing device and then automatically rendered by the process at the other end of the channel connection. In addition, the server can use the transaction information to determine one or more advertisements or discount offers to transmit to the user's computing device. The selection method can consist of one or more heuristics. In one example, the validation of the ticket for a baseball game can trigger the display of advertising for food or drinks. Likewise, a transaction for purchasing a cup of coffee can trigger an advertisement for purchasing a newspaper.

Operating Environment:

The system operates on one or more computers, typically one or more file servers connected to the Internet. The system is typically comprised of a central server that is connected by a data network to a user's computer. The central server may be comprised of one or more computers connected to one or more mass storage devices. A website is a central server that is connected to the Internet. The typical website has one or more files, referred to as web-pages, that are transmitted to a user's computer so that the user's computer displays an interface in dependence on the contents of the web-page file. The web-page file can contain HTML, or other data that is rendered by a program operating on the user's computer. That program, referred to as a browser, permits the user to actuate virtual buttons or controls that are displayed by the browser and to input alphanumeric data. The browser operating on the user's computer then transmits values associated with the buttons or other controls and any input alphanumeric strings to the website. The website then processes these inputs, in some cases transmitting back to the user's computer additional data that is displayed by the browser. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the customer may receive from and transmit data to the central server by means of the Internet, whereby the customer accesses an account using an Internet web-browser and browser displays an interactive webpage operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FOR-TRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A method performed by a computer system for displaying visual validation of the possession of a previously purchased electronic ticket for utilization of a service monitored by a ticket taker comprising:

transmitting a token associated with a previously purchased electronic ticket to a remote display device, wherein the token is a unique identifier and a copy of the unique identifier is stored on a central computer system;

validating the token by matching the token transmitted to the remote display device to the copy of the unique identifier stored on the central computing system to provide a ticket payload to the remote display device;

transmitting to the remote display device a validation display object associated with the ticket payload, the validation display object being configured to be readily recognizable visually by the ticket taker, in order to enable the remote display device to display the validation display object so that upon visual recognition by the ticket taker, the user of the remote display device is permitted to utilize the service monitored by the ticket taker; and wherein the ticket payload contains code that destroys the validating visual object in a predetermined period of time after initial display or upon some pre-determined input event.

2. The method of claim 1, further comprising: receiving from the remote display device a request to verify the purchase of the previously purchased electronic ticket;

determining the validity of the received request; and transmitting a response to the remote display device confirming the verification of the electronic ticket in order to cause the display of the validation display object on the remote display device.

3. The method of claim 2, further comprising:

transmitting the validation display object to the remote display device prior to the step of receiving the request for verification.

4. The method of claim 3, further comprising:

securing the validation display object prior to transmission of the validation display object so that it is secured against being displayable on the remote display device in the absence of the condition that the previously purchased electronic ticket has been verified.

5. The method of claim 4, wherein the securing step is comprised of:

encrypting the validation display object.

6. The method of claim 1, further comprising: transmitting validation display object to the remote device prior to the device verifying the electronic ticket.

7. The method of claim 6, further comprising:

securing the validation display object prior to its transmission so that it is secured against being displayable on the remote display device in the absence of the condition that the remote display device has verified the previously purchased electronic ticket.

8. The method of claim 7, where the securing step is comprised of:

encrypting the validation display object.

9. The method of claim 1, further comprising:

transmitting security data to the remote display device in order to cause the remote device to authenticate the validation display object.

10. A system for validating previously purchased electronic tickets for utilization of a service monitored by a ticket taker, comprising:

a central computer system and at least one remote display device operatively connected to the central computer system over a data communication network, wherein the central computer system transmits a token associated with the previously purchased electronic ticket to the at least one remote display device wherein the token is a unique identifier and a copy of the unique identifier is stored on a central computer system and upon a request received in the at least one remote display device validates the token associated with the previously purchased electronic ticket by matching the token transmitted to the remote display device to the copy of the unique identifier stored on the central computing system to provide a ticket payload to the at least one remote display device;

wherein the central computer system is configured to transmit to the display device over the data communication network a validating display object associated with the ticket payload, the visual validation display object being configured to be readily recognizable visually by the ticket taker;

the remote display device being configured so that the device enables display of the validating display object so that upon visual recognition by the ticket taker, the user is permitted to utilize the service monitored by the ticket taker, and wherein the ticket payload contains code that destroys the validating visual object in a predetermined period of time after initial display or upon some pre-determined input event.

11. The system of claim 10, wherein the transmitted validating display object is further configured to be secure from being displayable in the absence of the condition of verification of the purchased electronic ticket.

12. The system of claim 11, wherein the transmitted validating display object is further configured to be secure from being displayable by means of being encrypted.

13. The system of claim 11, wherein the remote display device is further configured to receive and store the validation display object prior to verification of the purchase of the electronic ticket.

14. The system of claim 13, wherein the remote display device is further configured to display the validating display object in the absence of a connection with the central system.

15. The system of claim 10, wherein the remote display device is further configured to display the validating display object in the absence of a connection with the central system.

16. The system of claim 15, wherein the transmitted validating display object is further comprised of data parameters that are configured to be used by the remote display device to perform the purchase validation.

17. The system of claim 10, wherein the validating display object is further configured to change based on a user of the remote display device actuating the user interface of the device in a predetermined manner.

18. The system of claim 17, wherein the predetermined manner of actuation is the user touching a predefined area of a display screen on the remote device.

19. The system of claim 18, wherein the predefined area of the display screen appears as a button.

20. The system of claim 17, wherein the predetermined manner of actuation is the input of a code into the remote device by the user.

21. The system of claim 17, wherein the predetermined manner of actuation is the input of a sound into the remote device.

22. The system of claim 17, wherein the predetermined manner of actuation is the detection of a predetermined location by means of a GPS detector incorporated within or attached to the remote device.

23. The system of claim 17, wherein the predetermined manner of actuation is input of a predetermined visual image.

24. The system of claim 10, wherein the validating display object is further configured to display in different versions of appearance where the selection of version is dependent on a pre-determined schedule.

25. The system of claim 10, further configured to transmit the validating display object to the remote device in dependence on completion of a purchase of the electronic ticket.

26. The system of claim 10, wherein the validation display object is configured to be unique to the specific remote device it is intended to be displayed on.

27. The system of claim 10, wherein the data communication network is configured to have a persistent channel between the central system and the remote device through which the central system can push content.

28. The system of claim 27, wherein the content is an advertisement that is selected from a plurality of advertisements in dependence on the type of purchased electronic ticket.

* * * * *

(12) INTER PARTES REVIEW CERTIFICATE (3342nd)
United States Patent (10) Number: US 10,346,764 K1
Bergdale et al. (45) Certificate Issued: Dec. 1, 2023

(54) METHOD AND SYSTEM FOR DISTRIBUTING ELECTRONIC TICKETS WITH VISUAL DISPLAY FOR VERIFICATION

(71) Applicants: Micah Bergdale; Nicholas Ihm; Gregory Valyer; Matthew Grasser; Samuel Krueckeberg

(72) Inventors: Micah Bergdale; Nicholas Ihm; Gregory Valyer; Matthew Grasser; Samuel Krueckeberg

(73) Assignee: BYTEMARK, INC.

Trial Number:

IPR2022-00621 filed Feb. 18, 2022

Inter Partes Review Certificate for:

Patent No.: 10,346,764
Issued: Jul. 9, 2019
Appl. No.: 14/823,157
Filed: Aug. 11, 2015

The results of IPR2022-00621 are reflected in this inter partes review certificate under 35 U.S.C. 318(b).

INTER PARTES REVIEW CERTIFICATE
U.S. Patent 10,346,764 K1
Trial No. IPR2022-00621
Certificate Issued Dec. 1, 2023

AS A RESULT OF THE INTER PARTES REVIEW PROCEEDING, IT HAS BEEN DETERMINED THAT:

Claims 3-8, 11-14 and 25 are found patentable.

Claims 1, 2, 9, 10, 15-24 and 26-28 are cancelled.

\* \* \* \* \*